United States Patent
Andersson et al.

(10) Patent No.: US 9,678,504 B2
(45) Date of Patent: Jun. 13, 2017

(54) REAL WORLD OBJECT CONTROL IN CONNECTED SYSTEMS

(75) Inventors: Ingeborg Andersson, Vasteras (SE); Johan Andersson, Vasteras (SE); Kjell Svensson, Vasteras (SE); Stefan Frennemo, Vasteras (SE)

(73) Assignee: ABB AB, Västerås (SE)

( * ) Notice: Subject to any disclaimer, the term of this patent is extended or adjusted under 35 U.S.C. 154(b) by 1903 days.

(21) Appl. No.: 12/196,962

(22) Filed: Aug. 22, 2008

(65) Prior Publication Data

US 2008/0319554 A1 Dec. 25, 2008

Related U.S. Application Data

(63) Continuation of application No. PCT/SE2007/000090, filed on Feb. 1, 2007.

(30) Foreign Application Priority Data

Feb. 24, 2006 (SE) ..................... 0600421

(51) Int. Cl.
*G06F 19/00* (2011.01)
*G05B 19/418* (2006.01)

(52) U.S. Cl.
CPC .............. *G05B 19/4185* (2013.01); *G05B 2219/31241* (2013.01); *Y02P 90/18* (2015.11)

(58) Field of Classification Search
None
See application file for complete search history.

(56) References Cited

U.S. PATENT DOCUMENTS

| | | | |
|---|---|---|---|
| 6,230,160 B1 | 5/2001 | Chan et al. | |
| 6,385,661 B1 | 5/2002 | Guthrie et al. | |
| 6,694,513 B1 | 2/2004 | Andersson et al. | |
| 6,857,015 B1 | 2/2005 | Michaud et al. | |
| 2001/0005846 A1* | 6/2001 | Barney et al. | 707/1 |
| 2002/0059282 A1* | 5/2002 | Andersson et al. | 707/100 |
| 2003/0115379 A1 | 6/2003 | Burton et al. | |
| 2007/0192363 A1* | 8/2007 | Larsen | 707/104.1 |

FOREIGN PATENT DOCUMENTS

| | | |
|---|---|---|
| EP | 0915419 A2 | 5/1999 |
| EP | 1420340 A1 | 5/2004 |
| WO | 0102953 A1 | 1/2001 |
| WO | 03032233 A1 | 4/2003 |
| WO | WO 2004057470 A1 * | 7/2004 |

OTHER PUBLICATIONS

Nishizawa et al., "Remote Pointcut—A Language Construct for Distributed AOP", Mar. 2004, ACM.*
International Search Report, Jun. 21, 2007, 4 Pages.

* cited by examiner

*Primary Examiner* — Umut Onat

(74) *Attorney, Agent, or Firm* — Whitmyer IP Group LLC

(57) ABSTRACT

The invention is directed towards providing control in a first computerized control system of a real world object provided in a second computerized control system that is connected to the first system. The real world object is represented in the second system by an originating container being linked to originating aspects representing data and/or operations of the originating container. Control in the first system is generally accomplished through providing, in the first system, a proxy container corresponding to the originating container in the second system together with aspects corresponding to originating aspects of the originating container and being linked to the proxy container.

49 Claims, 4 Drawing Sheets

REAL WORLD OBJECT CONTROL IN CONNECTED SYSTEMS

CROSS-REFERENCE TO RELATED APPLICATIONS

The present application is a continuation of pending International patent application PCT/SE2007/000090 filed on Feb. 1, 2007 which designates the United States and claims priority from Swedish patent application 0600421-2 filed on Feb. 24, 2006, the content of which is incorporated herein by reference.

FIELD OF THE INVENTION

The present invention relates to the field of computer based process control systems. The invention more particularly relates to a method, a container providing device, a first computerised control system including such a container providing device, connected systems and a computer program product for enabling control, in the first computerised control system, of a real world object provided in relation to a second computerised control system. The invention also relates to a method, a control handling device, a first computerised control system including such a control handling device, connected systems and a computer program product for providing control of a real world object, in the first computerised control system, of a real world object provided in relation to a second computerised control system.

BACKGROUND OF THE INVENTION

In contemporary computer based systems for controlling manufacturing and process industries, such as chemical plants, oil refineries, pulp and paper mills, steel mills, etc., there has typically existed a large range of different applications of different origin that have had to be integrated into a single control system. Further, a control system typically includes several computers connected through a communication network, where said applications are distributed in different configurations for different installations. Traditional methods for this integration have entailed extremely lengthy development times resulting, for example, in significant changes in requirements before such control programs have been completed and made ready for use. Another problem with traditional development methods is that it has been difficult and lengthy to update such control programs to include new requirements, such as the integration of additional and new applications. Writing and modifying control system programs to combine newer applications with older, existing applications has also been difficult, time consuming and expensive.

The adoption of object-oriented programming languages and methods has led to somewhat shorter development times, and made it somewhat easier to incorporate or integrate new applications.

There exists a tool that has been used for solving the problems mentioned above and that is the Component Object Model (COM). COM is described in The Component Object Model Specification available in the MICROSOFT™ MSDN Online Library on the web site maintained by Microsoft. Additional information about COM may be found in, amongst others, an article in Dr. Dobbs Journal December 1994 entitled The Component Object Model: Technical Overview.

WO-01/02953 entitled "Method of integrating an application in a computerized system" discloses a method for integration of many and various types of applications in a computerized system. This method is based on a concept where real world objects are represented as "composite objects". Different facets of a real world object, such as its physical location, the current stage in a process, a control function, an operator interaction, a simulation model some documentation about the object, etc., are each described as different aspects of the composite object. A composite object is a container for one or more such aspects. Thus, a composite object is not an object in the traditional meaning of object-oriented systems, but rather a container of references to such traditional objects which implement the different aspects. Each aspect or group of aspects may be implemented by an independent software application, which provides its functionality through a set of interfaces that are accessible through the composite object. Another software application can thus query a composite object for a function associated with one of its aspects, and as a result obtain through the composite object, a reference to the interface that implements the function.

The use of containers and aspects in a process control system is also described in WO-03/032233 entitled "Data access method for a control system".

Both these documents use containers and aspects that are provided based on COM objects.

Thus different tools have been provided for controlling industrial processes in a system in an efficient way. However, there may be a need for allowing control of a process provided in one system from another system.

One example of this is if there is a number of interconnected systems, which are to be monitored and controlled separately in the daytime, while at night control for all systems is to be provided from one of the systems. This should then be allowed to be performed in such a way that the night time operators should have the feeling that the connected systems are provided in one single system. The control should be possible to provide seamlessly and transparently.

There is therefore a need for providing the possibility to control from a first system a process running in a second system.

SUMMARY OF THE INVENTION

The present invention is therefore directed towards solving the problem of providing the possibility to control, from a first system, a process running in a second system, where a real world object is represented in the second system by an originating container being linked to at least one originating aspect representing data and/or operations of the originating container.

This is generally solved through providing, in the first system, a proxy container corresponding to the originating container in the second system together with aspects corresponding to originating aspects of the originating container and being linked to the proxy container.

One object of the present invention is thus directed towards providing a method for enabling control, in a first computerised control system, of a real world object provided in relation to a second computerised control system.

This object is according to a first variation of the present invention achieved through a method of enabling control, in a first computerised control system, of a real world object provided in relation to a second computerised control system, where said real world object is represented in the second system by an originating container being linked to at least one originating aspect representing data and/or operations of the originating container, comprising the steps of:
- creating, in the first system, a proxy container corresponding to the originating container in the second system,
- creating aspects corresponding to originating aspects of the originating container, and
- linking said created aspects to the created proxy container.

Another object of the present invention is directed towards providing a container providing device in a first computerised control system for enabling control of a real world object provided in relation to a second computerised control system.

This object is according to the first variation of the present invention also achieved through a container providing device in a first computerised control system, for enabling control of a real world object provided in relation to a second computerised control system, where said real world object is represented in the second system by an originating container being linked to at least one originating aspect representing data and/or operations of the originating container, arranged to:
- create a proxy container corresponding to the originating container in the second system,
- create aspects corresponding to originating aspects of the originating container, and
- link said created aspects to the created proxy container.

Another object of the present invention is directed towards providing a first computerised control system providing control of a real world object provided in relation to a second computerised control system.

This object is according to the first variation of the present invention also achieved through a first computerised control system providing control of a real world object provided in relation to a second computerised control system, where said real world object is represented in the second system by an originating container being linked to at least one originating aspect representing data and/or operations of the originating container and comprising a control handling device arranged to:
- create a proxy container corresponding to the originating container in the second system,
- create aspects corresponding to originating aspects of the originating container, and
- link said created aspects to the created proxy container.

Another object of the present invention is directed towards providing connected systems including a first and a second computerised control system, where control is enabled in a first computerised control system of a real world object provided in a second computerised control system.

This object is according to the first variation of the present invention also achieved through connected systems comprising a first computerised control system and a second computerised control system both providing control of real world objects, where a real world object in the second system is represented by an originating container being linked to at least one originating aspect representing data and/or operations of the originating container, the first control system comprising a container providing device arranged to:
- create a proxy container corresponding to the originating container in the second system,
- create aspects corresponding to originating aspects of the originating container, and
- link said created aspects to the created proxy container.

Another object of the present invention is directed towards providing a computer program product, which enables control, in a first computerised control system, of a real world object provided in relation to a second computerised control system.

This object is according to the first variation of the present invention also achieved through a computer program product for enabling control, in a first computerised control system, of a real world object provided in relation to a second computerised control system, where said real world object is represented in the second system by an originating container being linked to at least one originating aspect representing data and/or operations of the originating container, comprising computer program code to make a container providing device in the first control system perform, when said code is loaded into the container providing device:
- create a proxy container corresponding to the originating container in the second system,
- create aspects corresponding to originating aspects of the originating container, and
- link said created aspects to the created proxy container.

Yet another object of the present invention is to provide a method of providing control of a real world object, in a first computerised control system, of a real world object provided in relation to a second computerised control system.

This object is according to a second variation of the present invention achieved by a method of providing control of a real world object, in a first computerised control system, of a real world object provided in relation to a second computerised control system, where said real world object is represented in the second system by an originating container being linked to at least one originating aspect representing data and/or operations of the originating container, comprising the steps of:
- receiving, in a proxy container, an access request to a function related to the proxy container,
- locating an aspect associated with the function,
- if the aspect is a first aspect being a copy of an originating aspect of the second system invoking a function in the first system of said first aspect, and
- if the aspect is a second proxy aspect invoking a function in the second system associated with a corresponding originating aspect via said second proxy aspect.

Another object of the present invention is directed towards providing a control handling device providing control of a real world object, in a first computerised control system, of a real world object provided in relation to a second computerised control system.

This object is according to the second variation of the present invention also achieved through a control handling device providing control of a real world object, in a first computerised control system, of a real world object provided in relation to a second computerised control system, where said real world object is represented in the second system by an originating container being linked to at least one originating aspect representing data and/or operations of the originating container and comprising
- at least one proxy container corresponding to an originating container in the second system, and
- aspects corresponding to originating aspects of the originating container, being linked to said proxy container.

Still another object of the present invention is directed towards providing a first computerised control system providing control of a real world object provided in relation to a second computerised control system.

This object is according to the second variation of the present invention also achieved through a first computerised control system providing control of a real world object provided in relation to a second computerised control system, where said real world object is represented in the second system by an originating container being linked to at least one originating aspect representing data and/or operations of the originating container and comprising a control handling device having
  at least one proxy container corresponding to an originating container in the second system, and
  aspects corresponding to originating aspects of the originating container, being linked to said proxy container.

Still another object of the present invention is directed towards providing connected systems including a first and a second computerised control system, where control is provided in a first computerised control system of a real world object provided in a second computerised control system.

This object is according to the second variation of the present invention also achieved through connected systems comprising a first computerised control system and a second computerised control system,
  the second system comprising
    at least one originating container for control of a real world object and being linked to at least one originating aspect representing data and/or operations of the originating container,
  the first control system comprising a control handling device having:
    at least one proxy container corresponding to an originating container in the second system, and
    aspects corresponding to originating aspects of the originating container, being linked to said proxy container.

Yet another object of the present invention is directed towards providing a computer program product for providing control of a real world object, in a first computerised control system, of a real world object provided in relation to a second computerised control system.

This object is according to the second variation of the present invention also achieved through a computer program product for providing control of a real world object, in a first computerised control system, of a real world object provided in relation to a second computerised control system, where said real world object is represented in the second system by an originating container being linked to at least one originating aspect representing data and/or operations of the originating container, comprising computer program code to make a control handling device implement, when said code is loaded into the control handling device:
  at least one proxy container corresponding to an originating container in the second system, and
  aspects corresponding to originating aspects of the originating container linked to said proxy container.

The present invention has many advantages. It allows the control of real world objects in a second system from a first system in a seamless fashion. This is advantageous when control is to be transferred especially if the control is to be transferred temporarily. From the viewpoint of operators of the first system, the control does furthermore not appear to be remote but local. Systems can furthermore be cross-connected allowing systems that would be very costly to build as one system be built more inexpensively as two systems. The invention furthermore allows the provision of a system that can be engineered locally, but be operated centrally or remotely.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
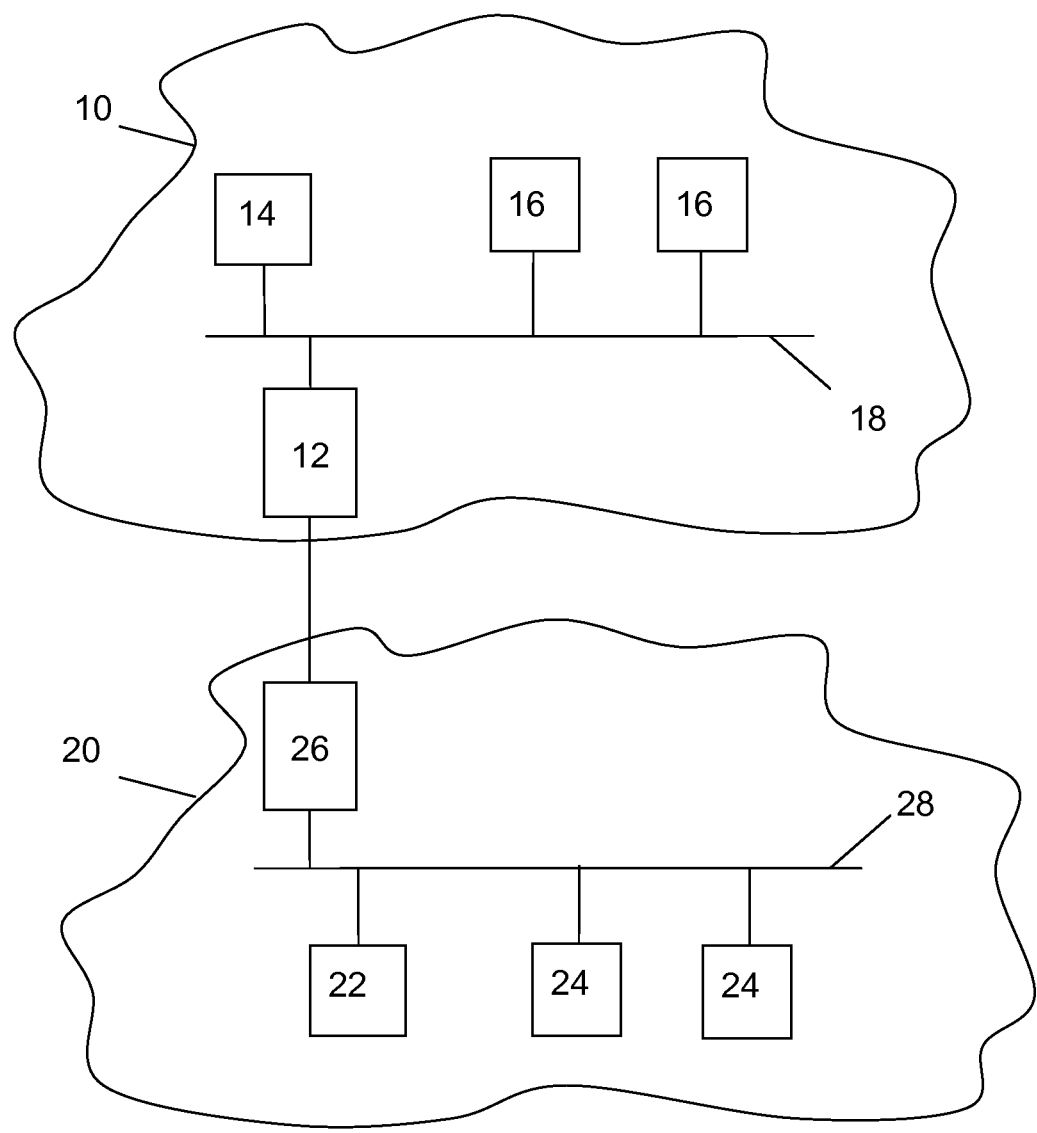
FIG. 1 schematically shows two control systems that are connected to each other.

FIG. 1 schematically shows a first and a second control system 10 and 20 connected to each other. Each system 10, 20 is typically a computerised system for controlling a process or perhaps part of a process. Typical processes are electrical power generation and supply process, water purification and distribution processes, oil and gas production and distribution processes, petrochemical, chemical, pharmaceutical and food processes, and pulp and paper production processes. These are just some examples of processes where the systems can be applied. There exist countless other processes. Normally in a process there may be one or more controllers having some local software for controlling one or more real time objects in a process. The real world objects may be different entities that influence the technical process, like such things as a pump, a motor, a valve, etc., or a more abstract object such as a purchase order, production batch, etc. A process, or a part of a process, may be controlled via a control handling device, which is here a server, which then typically communicates with a controller for providing control of a process. The process may be monitored through an operator terminal which communicates with the server.

In FIG. 1 the first system 10 includes an operator terminal, also denoted client terminal 14, a control handling device in the form of a first server 12 as well as two controllers 16 (Process Controllers or Programmable Logic Controller PLC) all interconnected via a bus 18 for providing control in the first system 10. A controller is then typically connected to the real world object. In the same way the second system 20 comprises an operator terminal, also denoted client terminal 22, a second server 26 and two controllers 24 interconnected via a bus 28 for providing control in the second system 20. In order for the two systems to communicate with each other the two servers 12 and 26 are connected to each other. Normally the servers 12 and 26 are furthermore connected to each other via an interfacing arrangement, for instance an arrangement including a gateway and a firewall. However, in order to provide a clear description of the present invention the systems shown are much simplified and therefore this interfacing arrangement is omitted. In reality there are normally also several different controllers, several different client terminals and perhaps also several different servers in each system. The client terminals may also be different in that some may be provided as so-called operator workstations, while other may be engineering workstations. In the context of a variation of the present invention, the client terminals of the first system are only operator workstations.

Figure 2:
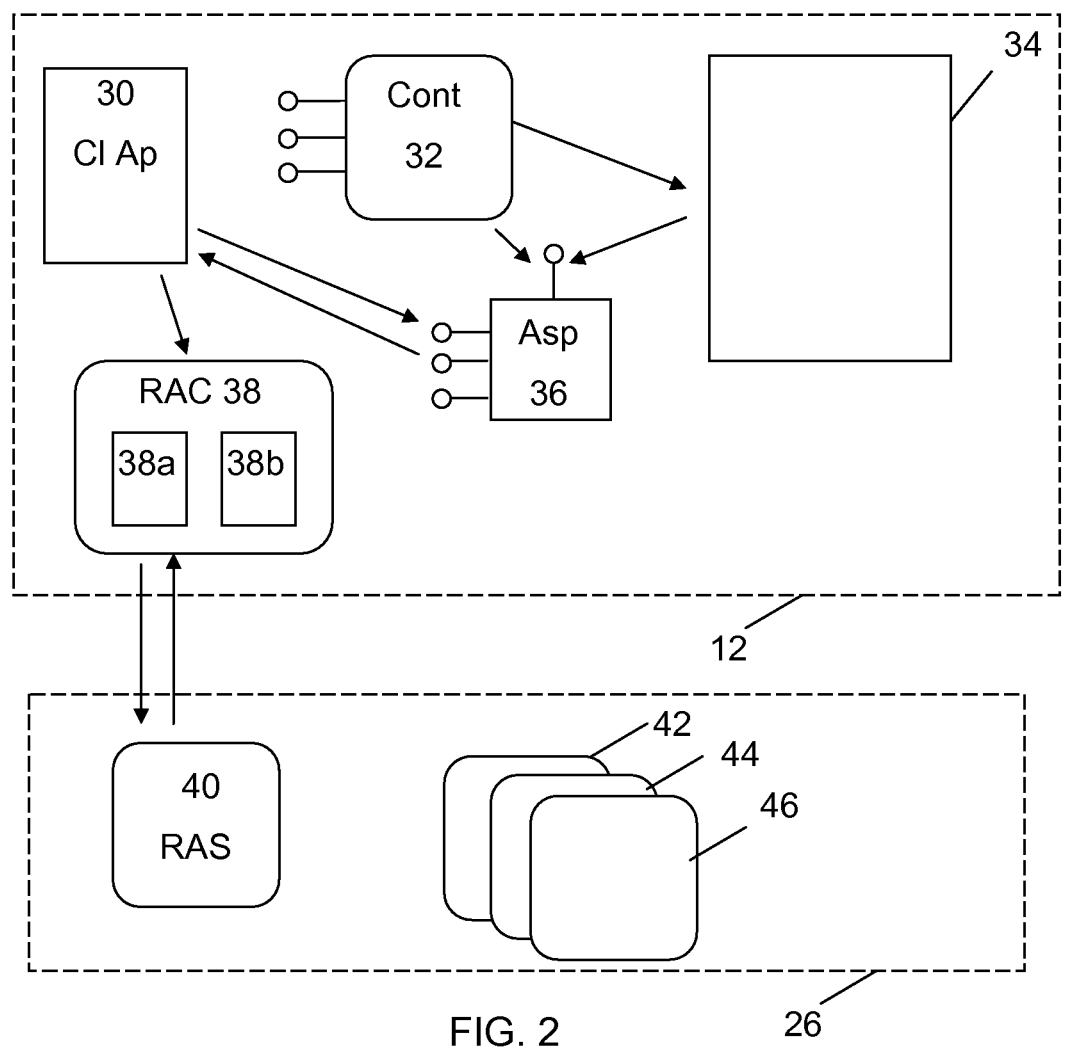
FIG. 2 shows a block schematic of a first server comprising a client application, a container and an aspect linked to the container, a table for locating the aspect, as well as a remote access client communicating with a second server having a remote access server and a number of containers.

In order to control the real world objects of a process, containers are used, where there is one container for each real world object. FIG. 2 shows a block schematic of the first server 12 comprising a client application 30, a container Cont 32, an aspect Asp 36 and an aspect lookup table 34. The first server 12 also includes a Remote Access Client (RAC) 38 which communicates with an access providing unit in the form of a Remote Access Server (RAS) 40 provided in the second server 26. The RAC 38 includes a container providing device 38a, which is an uploading unit, as well as an access requesting unit 38b. In the second server 26 there are also a number of containers 42, 44 and 46. The RAC 38 and the RAS 40 are here shown as provided in the two servers where containers are provided. It should be realised that they can be provided in separate servers as well. The client application needs furthermore not be provided in the first server 12, but may for instance be provided in the client terminal of the first system and communicate with the first server instead.

In an embodiment of the invention, the container 32 is a so-called COM object having a number of interfaces, where three are shown in FIG. 2. COM is an existing published standard and as such is a part of the prior art. More information about COM may for instance be found in the MICROSOFT™ MSDN Online Library on the web site maintained by Microsoft. Additional information about COM may also be found in, amongst others, an article in Dr. Dobbs Journal December 1994 entitled The Component. Object Model: Technical Overview. WO-01/02953, which is herein incorporated by reference.

Through the container 32, the client application 30 can invoke a function that is related to an aspect that is held by the container 32. The client application does this by querying the container 32 for an interface to this function, without knowing the identity of the application that implements the function for which it is seeking an interface. If the container has an aspect that supports the interface then a reference to the interface is returned as some form of pointer to where that interface may be found.

The container Cont 32 thus holds a number of aspects, of which one Asp 36 is shown in FIG. 2. Each aspect, which thus may be provided as a COM object, is related to the real world object provided in the first system. An aspect represents one facet of the real world object, and is responsible for all operations on that facet of the object and its data. Thus for a pump for example, one aspect could represent a physical location, another aspect could represent a blue print diagram of the pump, another a security descriptor for the pump, another aspect could represent a control for an operation of the pump and yet another aspect could represent documentation about the pump. The aspect that represents the facet has an association to a function of an application that can, referring to the above example, display the blueprint diagram, or control the operation of the pump. All aspects are created through an aspect category. The aspect category contains information that is shared between all instances of the category. Each aspect category refers to one aspect type. This aspect type describes the implementation of an aspect. The container does itself not hold any data, but data is provided in aspects or in relation to aspects.

An aspect belongs to an aspect type (through its category) which lists the set of COM objects that implements the functionality of the aspect. This implementation is provided by an object, referred to as an Aspect System Object (ASO), which is a COM compliant object. Stated differently, the aspect type contains the binding information between an aspect and the one or more applications that implement its functionality.

The container furthermore has access to an aspect lookup table 34, through which it may locate an aspect.

Thus the client application 30 when needing to access a facet of the real world object connects to the container 32 and requests an interface associated with said facet. The container then locates an aspect 36 associated with the facet via the aspect table 34, interrogates the aspect regarding its interfaces, receives information of an interface and returns the interface, through which the client application may connect to the aspect for retrieving data, control the real world object, etc. What has been described so far is known within the art and not a part of the present invention. Details regarding this is described in further detail in WO-01/02953, which is herein incorporated by reference.

What has been described above is thus the normal known way containers and aspects function when they are provided in one and the same system. According to the present invention containers relating to real world objects in the second system may be provided in the first system and vice versa.

Figure 3:
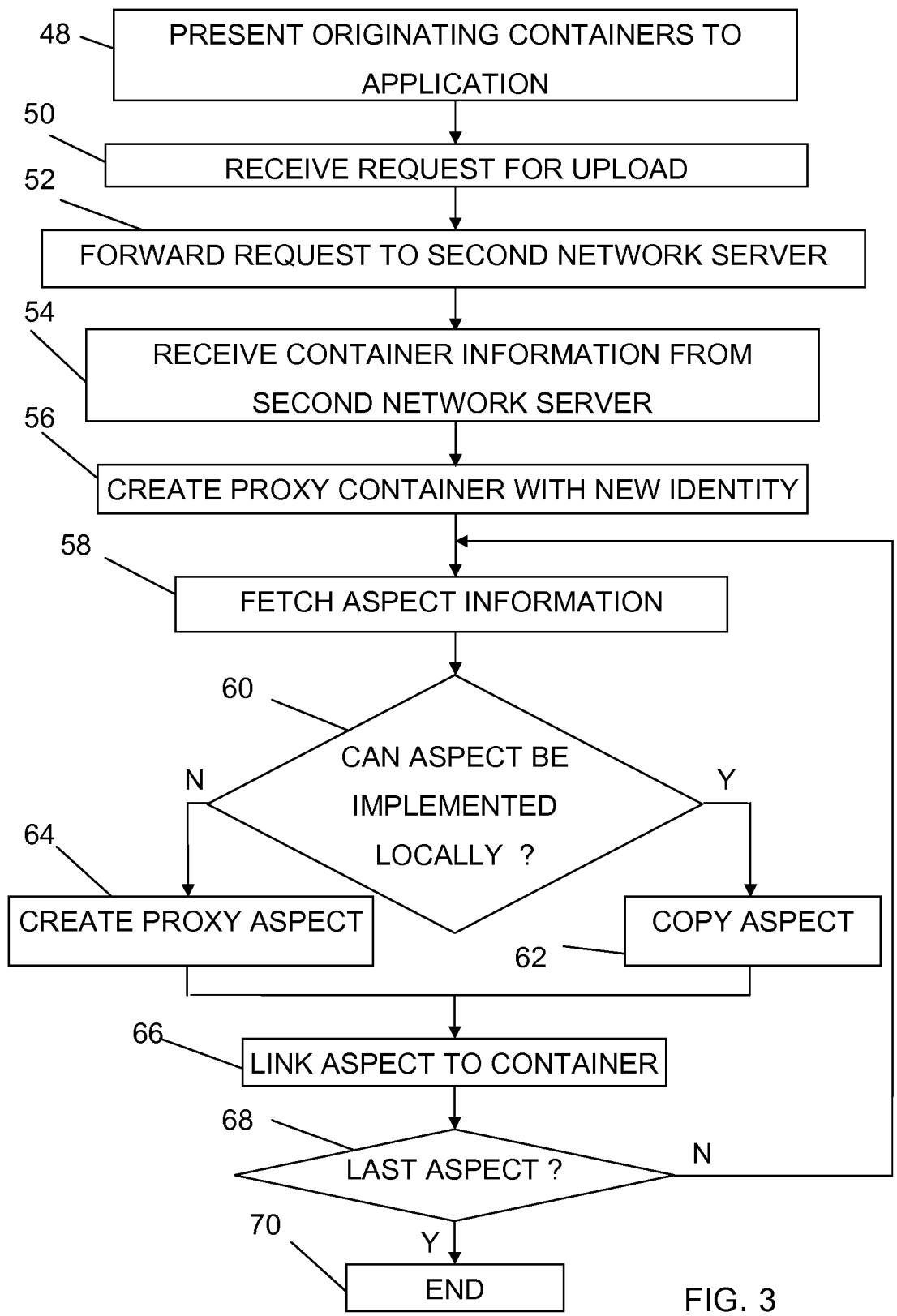
FIG. 3 shows a flow chart outlining a method according to a first variation of the present invention.

In order to be able to upload information about containers from the second system the application may now communicate with the RAC 38. The RAC 38 is in this embodiment provided as a container, which has a number of aspects handling communication with the second system. The container providing device or the uploading unit 38a is one such aspect, and the access requesting unit 38b is another such aspect. In the same way the RAS 40 is here also a container having a number of aspects handling communication with the RAC 38. Now the uploading of containers and aspects from the second system, to the first system will be described with reference being made to FIGS. 1 and 2 together with FIG. 3, which latter figure shows a flow chart of a method according to the present invention.

The client application 30 may connect to the RAC 38 in order to look at the containers in the second system 20, here also denoted originating containers, in order for a client or user of the terminal 14 to decide what containers that are to be uploaded. The client application then connects to the uploading unit 38a. From FIG. 2 it can be seen that in the present example there are three such originating containers 42, 44 and 46 that may be uploaded. Thus first the originating containers 42, 44 and 46 are presented to the client application 30, step 48, through the uploading unit 38a fetching information about them from the RAS 40. The second system 20 may here have restrictions on containers that are presented. There may thus exist containers that are not possible to upload. The restrictions may be applied by the RAS 40. In dependence of a user of the client application 30 selecting one or more containers to upload, the selection is received by the uploading unit 38a of the RAC 38, step 50, which goes on and forwards selection information to the RAS 40 of the second server 26, step 52, which in turn goes on and fetches container information in the second server 26. For each container, the container information is then forwarded from the RAS to the uploading unit 38a of the RAC 38, step 54, which creates a proxy container corresponding to the originating container selected, but having another identity, step 56, and stores it in the first server 12. There is also a mapping being made in the RAC 38 between the originating container and newly created proxy container. It should here be noted that the RAS 40 may deny a mapping of an originating container to a proxy container. Thereafter the container providing device or uploading unit 38a of the RAC 38 goes on and fetches aspect information, via the RAS 40, regarding the originating aspects associated with the originating container, step 58. When aspect information is fetched, there is an investigation being made of if the aspect can be implemented locally, i.e. if it relates to a function that can be implemented locally in the first system or not, such as providing static data about the object. If the originating aspect can be implemented locally in the first system, step 60, the whole aspect is copied to the first server 12 and provided as a first aspect, step 62. If the copied originating aspect comprises references to the originating container identity these references are changed to referencing the proxy container identity instead. If however the originating aspect cannot be implemented locally in the first system, step 60, a proxy aspect is created that invokes a function in the second system associated with the originating aspect. The proxy aspect thus provides access for the client application to elements or locations in the second system 20 associated with the corresponding originating aspect, step 64. This is in one embodiment done through copying possible static data included in the originating aspect and providing a link to a location where the function and/or the originating aspect will be found. This can be a location providing dynamic data that is associated with the aspect or to a location in the second system where dynamic data is handled. If the static data copied also here includes references to the originating container identity these references are changed to referencing the proxy container identity. Thereafter the created aspect is stored in the first server 12 and linked to the proxy container, step 66. If the aspect was the last aspect of the container, step 68, the method is then ended, step 70, while if it was not, step 68, the method goes back and yet again fetches aspect information, step 58. In the course of aspect upload an aspect look up table is also created. The method is then repeated for each container that is selected to be uploaded. It should here be realised that it is possible for the RAS 40 in the second system to deny upload of some aspects.

A first aspect can here be an aspect that relates to static data, such as a presentation aspect, like an aspect providing graphics information on how a real world object is to be presented or how some information relating to the real world object is to be presented to a user of the client terminal. A proxy aspect is typically an aspect that provides access to a function in the second system, for instance a function providing control of a real world object or that handles some sort of values, like real time data associated with the real world object, historical log data or subscribes to event and alarm data. In these instances the link may be to the corresponding aspect of the originating container. The link may also be to for instance a log kept for a real world object and provided on the second server or somewhere else in the second system. A second proxy aspect may therefore provide a link to the corresponding originating second aspect, which in turn may access the function or implement the function itself. The function may then include data or provide control of the real world object. The originating aspect may for instance have received data from a device controlling the real world object. The link may also be a link to some other entity in the second system providing the function for the originating aspect. Event and alarm data regarding a certain type of event may for instance be provided in one location for a number of different real world objects. Thus the second proxy aspect may as an example provide access or a link to real time data of a real world object. It may as another example also be a log aspect that provides a link to historical or log data associated with the originating aspect. It may as a further example also provide a link to alarm and event data associated with said originating aspect, so that the client application may subscribe to alarm and event data related to the real world object from the second system.

When the container and the aspects have been uploaded to the first system, the client application of the first system can access the proxy container in the same way as it accesses local containers of local real world objects in the first system. Two such situations will now be explained with reference being made to FIGS. 4 and 5.

Figure 4:
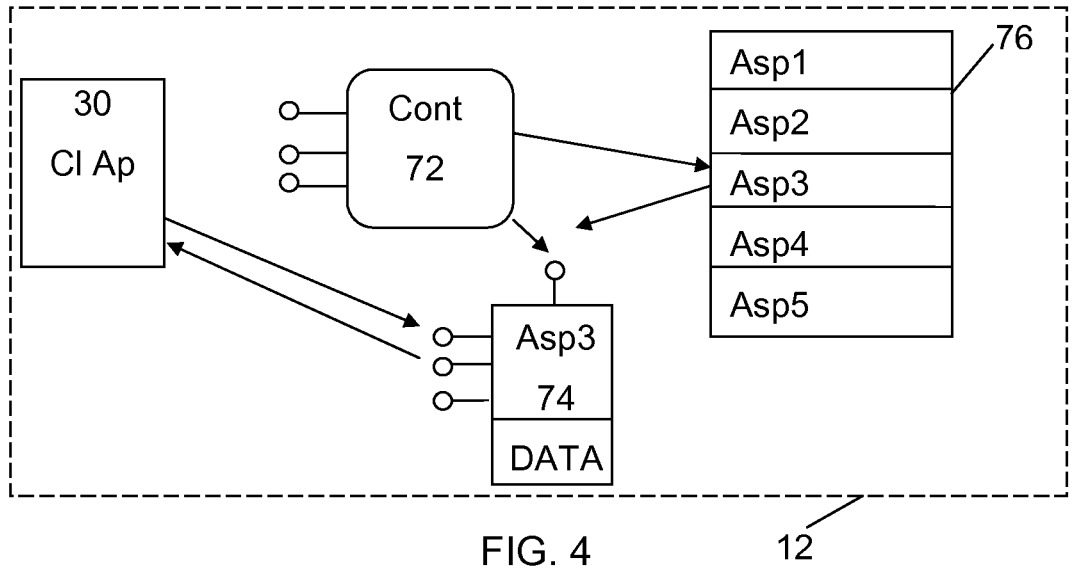
FIG. 4 shows a block schematic of the first server similar to the first server of FIG. 2, having a proxy container and an associated first aspect comprising static data.

In FIG. 4, when the client application needs to invoke a function that is provided locally in the first system, it connects to an uploaded proxy container 72, which goes on and locates an aspect, here asp3 74 in the aspect table 76, as the aspect handling the desired function, and returns an interface of this aspect to the client application 30. If the client application 30 then invokes the function via the aspect asp3 74, the function is then performed locally in the first system. As an example the aspect asp3 provides data and here the data DATA is then provided directly from the aspect 74 to the client application 30 via said interface. Thus here the aspect functions as any local aspect for real world objects provided in the first system.

Figure 5:
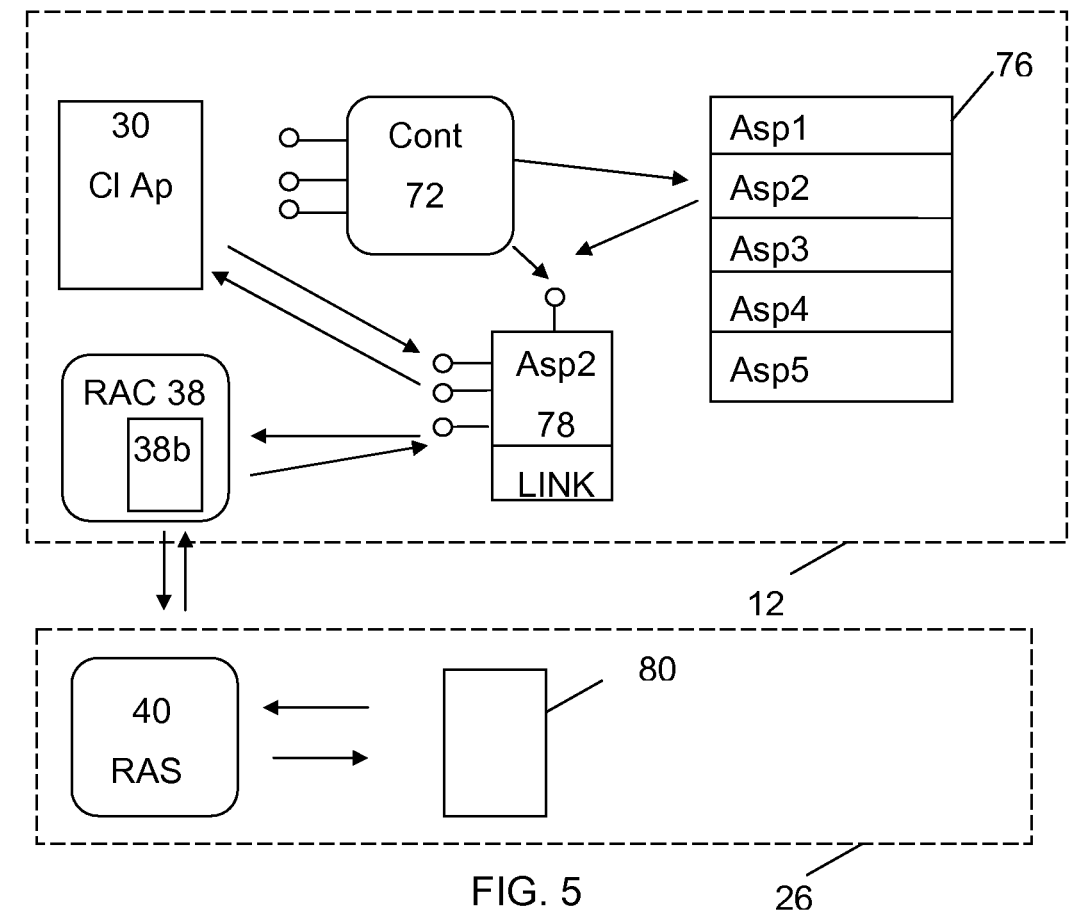
FIG. 5, shows a block schematic of a first server communicating with a second server and having a second proxy aspect that is associated with handling of dynamic data, and FIG. 6, schematically shows a computer program product in the form of a CD Rom disc comprising computer program code for carrying out the invention.

In FIG. 5, the aspect associated with a function that the client application 30 desires to invoke, is proxy aspect Asp2 78. The container 72 here locates the second proxy aspect using the aspect table 76 in a known manner and provides the interface of the second proxy aspect 78 to the client application 30. However, when the client application invokes the aspect, it in turn connects to the access requesting unit 38b of RAC 38 and accesses a function 80 on the second server 26 via the RAS 40 using the link LINK. As an example also this aspect provides data, which data is then returned from the function 80 to the proxy aspect 78, which presents it in a suitable format for the client application 30. This is however not apparent from the view point of the client application 30, which believes it interacts with a local container and a local aspect.

Some variations of the invention are related to accessing of data. More details regarding how access of data may be implemented in a system is described in WO-03/032233, which is herein incorporated by reference.

According to one variation of the present invention aspects related to engineering, i.e. updating of controlling software or provision of new control software is not possible for proxy containers and their aspects. This means that any changes to control programs in the second system can only be provided locally in the second system.

The present invention has a number of advantages. It allows the control of real world objects provided in a second system from a first system in a seamless fashion. This is advantageous when control is to be transferred especially if the control is to be transferred temporarily. From the viewpoint of the operators or clients of the first system, the control does furthermore not appear to be remote but local. Systems can furthermore be cross-connected allowing systems that would be very costly to build as one system to be built more inexpensively as two systems. The invention furthermore allows the provision of a system that can be engineered locally, i.e. update and provide new process control, but be operated centrally or remotely. By copying aspects and functions that can be provided locally to the first system and providing links for proxy aspects, the amount of data transferred is furthermore effective, which may be important if the connection between the systems has limited bandwidth or is associated with costs. It also avoids many and unnecessary data updates that would otherwise be required in the first system. In this way it is possible to provide two systems where control may be provided temporarily or permanently from the second system to the first system. In the case of temporary control, this may for instance be provided at night or other times when the second system is not staffed by operators.

It is within the scope of the claims of the present invention to include computerised systems that comprise any communication means or combination thereof, including but not limited to direct hard-wired links, networks, intranets, the Internet, public or private telephone lines, radio links, infrared links or links using optic fibres.

There are several modifications that can be made of the present invention. It should first be realised that the client application may be provided in a client terminal. It should also be realised that the RAC and RAS may be provided in separate physical entities in the first and second system respectively. More than two systems may be interconnected in this way. There may thus be more than one first system that uploads containers and aspects from a second system, more than one second system from which a first system uploads containers and aspects as well as both more than one first and second systems. Then one system may be a supervising system, which supervises other connected systems, or a cooperating system, where the systems are on the same level. It is of course also possible that the second system could be able to upload containers and aspects from the first system in the same way as the first system uploads containers and aspects. It is furthermore possible that the first system does not include any real world object and control of real world objects, but is only provided for remote control of one or more second systems. It is furthermore possible that uploads are not performed at all, but that proxy containers and corresponding aspects are provided in a system from the start. The invention has been described using COM objects. The invention is not limited to COM. Other object technologies that can be used are for instance COBRA and JAVA™. The invention may furthermore be implemented based on web services instead.

Figure 6:
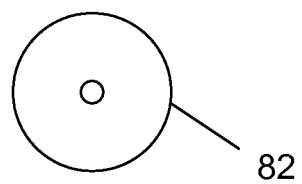

The different units of the present invention according to the present invention can be implemented through one or more processors together with computer program code for performing the functions of the invention. The program code mentioned above may also be provided as a computer program product, for instance in the form of one or more data carriers carrying computer program code for performing the functionality of the present invention when being loaded into a server. One such carrier 82, in the form of a CD ROM disc is generally outlined in FIG. 6. It is however feasible with other data carriers. The computer program code can furthermore be provided as pure program code on a server and downloaded to the first system.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

What is claimed is:

1. Method of enabling control, in at least one first computerised control system, of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container, comprising the steps of:
creating, in the first system, a proxy container corresponding to the originating container in the second system,
creating aspects corresponding to originating aspects of the originating container,
linking said created aspects to the created proxy container,
receiving, in the proxy container, an access request to a function related to the proxy container,
locating an aspect associated with the function,
determining whether the aspect is a first aspect being a copy of an originating aspect of the second system or a second proxy aspect,
invoking a function in the first system of said first aspect if the aspect is a first aspect being a copy of an originating aspect of the second system, and
invoking a function in the second system associated with a corresponding originating aspect via said second proxy aspect if the aspect is a second proxy aspect;
wherein the second system restricts for which originating containers a proxy container can be created.

2. The method according to claim 1, wherein the step of creating aspects comprises creating at least one first aspect as a copy of a corresponding originating first aspect in the second system.

3. The method according to claim 1, wherein the step of creating aspects comprises creating at least one second proxy aspect corresponding to an originating second aspect in the second system, said second proxy aspect invoking a function in the second system associated with the corresponding originating second aspect for clients of the first system.

4. The method according to claim 3, wherein at least one second proxy aspect forwards requests from a client of the first system to a corresponding originating second aspect in the second system, receives responses from said originating second aspect in the second system and returns these to the client of the first system.

5. The method according to claim 3, wherein at least one second proxy aspect provides access for clients of the first system to real time data associated with the corresponding originating aspect in the second system.

6. The method according to claim 3, where at least one second proxy aspect provides access for clients of the first system to historical data associated with the corresponding originating aspect in the second system.

7. The method according to claim 3, where at least one second proxy aspect provides access for clients of the first system to alarm and event data associated with the corresponding originating aspect in the second system.

8. The method according to claim 1, further comprising the step of giving the proxy container an identity that is different from the identity of the originating container.

9. The method according to claim 1, further comprising the step of receiving a request for upload of an originating container from a client, forwarding the request to the second system, and receiving container information enabling the creation of the proxy container from the second system as a response to the request for upload.

10. The method according to claim 9, further comprising the step of presenting containers that can be uploaded to a client application before receiving a request for upload.

11. The method according to claim 1, further comprising the step of mapping proxy container identity to originating container identity.

12. The method according to claim 11, further comprising the step of restricting by the second system the originating containers that can be mapped to proxy containers in the first system.

13. The method according to claim 1, wherein there is more than one second system for which containers and aspects can be created in the first system.

14. The method according to claim 1, wherein there is more than one first system in which containers and aspects can be created for originating containers and aspects of second systems.

15. The method according to claim 1, wherein the steps of creating a proxy container and creating aspects is performed in the at least one second system for an originating container and corresponding originating aspects of the originating container in the at least one first system.

16. Container providing device in a first computerised control system, for enabling control of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container, arranged to:
  create a proxy container corresponding to the originating container in the second system,
  create aspects corresponding to originating aspects of the originating container,
  link said created aspects to the created proxy container,
  receive, in the proxy container, an access request to a function related to the proxy container,
  locate an aspect associated with the function,
  determine whether the aspect is a first aspect being a copy of an originating aspect of the second system or a second proxy aspect,
  invoke a function in the first system of said first aspect if the aspect is a first aspect being a copy of an originating aspect of the second system, and
  invoke a function in the second system associated with a corresponding originating aspect via said second proxy aspect if the aspect is a second proxy aspect;
  wherein the second system restricts for which originating containers a proxy container can be created.

17. The container providing device according to claim 16, which when being arranged to create aspects is arranged to create at least one first aspect as a copy of a corresponding originating first aspect in the second system.

18. The container providing device according to claim 16, which when being arranged to create aspects is arranged to create at least one second proxy aspect corresponding to an originating second aspect in the second system, said second proxy aspect invoking a function in the second system associated with the corresponding originating second aspect for clients of the first system.

19. The container providing device according to claim 18, wherein at least one second proxy aspect is arranged to forward requests from a client of the first system to a corresponding originating second aspect in the second system, receive responses from said originating second aspect in the second system and return these to the client of the first system.

20. The container providing device according to claim 18, wherein at least one second proxy aspect is arranged to provide access for a client of the first system to real time data associated with the corresponding originating aspect in the second system.

21. The container providing device according to claim 18, where at least one second proxy aspect is arranged to provide access for a client of the first system to historical data associated with the corresponding originating aspect in the second system.

22. The container providing device according to claim 18, where at least one second proxy aspect is arranged to provide access for a client of the first system to alarm and event data associated with the corresponding originating aspect in the second system.

23. The container providing device according to claim 16, which when creating the proxy container is arranged to give said proxy container an identity that is different from the identity of the originating container.

24. The container providing device according to claim 16, being further arranged to receive a request for upload of an originating container from a client, forward the request to the second system, and receive container information enabling the creation of the proxy container from the second system as a response to the request for upload.

25. The container providing device according to claim 16, being further arranged to perform a mapping between a proxy container identity and an originating container identity.

26. First computerised control system providing control of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container and comprising a container providing device arranged to:
  create a proxy container corresponding to the originating container in the second system,
  create aspects corresponding to originating aspects of the originating container,
  link said created aspects to the created proxy container,
  receive, in the proxy container, an access request to a function related to the proxy container,
  locate an aspect associated with the function, determine whether the aspect is a first aspect being a copy of an originating aspect of the second system or a second proxy aspect,
invoke a function in the first system of said first aspect if the aspect is a first aspect being a copy of an originating aspect of the second system, and
invoke a function in the second system associated with a corresponding originating aspect via said second proxy aspect if the aspect is a second proxy aspect;
wherein the second system restricts for which originating containers a proxy container can be created.

27. Connected systems comprising at least one first computerised control system and at least one second computerised control system both providing control of real world objects, where said first system comprises at least one container for control of a real world object in the first system and being linked to at least one aspect representing data or operations of the container and where the real world object in the second system is represented by an originating container being linked to at least one originating aspect representing data or operations of the originating container, the first control system comprising a container providing device arranged to:
create a proxy container corresponding to the originating container in the second system,
create aspects corresponding to originating aspects of the originating container,
link said created aspects to the created proxy container,
receive, in the proxy container, an access request to a function related to the proxy container,
locate an aspect associated with the function,
determine whether the aspect is a first aspect being a copy of an originating aspect of the second system or a second proxy aspect,
invoke a function in the first system of said first aspect if the aspect is a first aspect being a copy of an originating aspect of the second system, and
invoke a function in the second system associated with a corresponding originating aspect via said second proxy aspect if the aspect is a second proxy aspect;
wherein the second system restricts for which originating containers a proxy container can be created.

28. The connected systems according to claim 27, wherein the second system comprises an access providing unit, wherein the container providing device is further arranged to receive a request for upload of an originating container from a client, forward the request to the access providing unit, and receive container information enabling the creation of the proxy container from the access providing unit as a response to the request for upload.

29. The connected systems according claim 28, wherein the access providing unit is arranged to restrict the originating containers for which proxy containers can be created.

30. The connected systems according to claim 27, wherein the container providing device is arranged to create a mapping between a proxy container identity and an originating container identity.

31. The connected systems according to claim 30, wherein the access providing unit is arranged to restrict the originating containers that can be mapped to proxy containers in the first system.

32. The connected systems according to claim 27, wherein there is more than one second system for which containers and aspects can be created in the first system.

33. The connected systems according to claim 27, wherein there is more than one first system in which containers and aspects can be created for originating containers and aspects of second systems.

34. The connected systems according to claim 27, wherein there is a container providing device arranged to create a proxy container and aspects in at least one second system for an originating container and corresponding originating aspects of the originating container in at least one first system.

35. Computer program product comprising computer software recorded on a non-transitory computer-readable medium which when executed on a processor operates to control, in a first computerised control system, a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container, comprising computer program code to make a container providing device in the first control system perform when said code is loaded into the container providing device:
create a proxy container corresponding to the originating container in the second system,
create aspects corresponding to originating aspects of the originating container,
link said created aspects to the created proxy container,
receive, in the proxy container, an access request to a function related to the proxy container,
locate an aspect associated with the function,
determine whether the aspect is a first aspect being a copy of an originating aspect of the second system or a second proxy aspect,
invoke a function in the first system of said first aspect if the aspect is a first aspect being a copy of an originating aspect of the second system, and
invoke a function in the second system associated with a corresponding originating aspect via said second proxy aspect if the aspect is a second proxy aspect;
wherein the second system restricts for which originating containers a proxy container can be created.

36. Method of providing control, in a first computerised control system, of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container, comprising the steps of:
receiving, in a proxy container, an access request to a function related to the proxy container,
locating an aspect associated with the function,
if the aspect is a first aspect being a copy of an originating aspect of the second system, then invoking a function in the first system of said first aspect, and
if the aspect is a second proxy aspect, then invoking a function in the second system associated with a corresponding originating aspect via said second proxy aspect;
wherein the second system restricts for which originating containers a proxy container can be created.

37. Control handling device providing control, in a first computerised control system, of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container and comprising:
    at least one proxy container corresponding to an originating container in the second system, and
    aspects corresponding to originating aspects of the originating container, being linked to said proxy container,
    wherein the device is arranged to
    receive, in the proxy container, an access request to a function related to the proxy container,
    locate an aspect associated with the function,
    determine whether the aspect is a first aspect being a copy of an originating aspect of the second system or a second proxy aspect,
    invoke a function in the first system of said first aspect if the aspect is a first aspect being a copy of an originating aspect of the second system, and
    invoke a function in the second system associated with a corresponding originating aspect via said second proxy aspect if the aspect is a second proxy aspect;
    wherein the second system restricts for which originating containers a proxy container can be created.

38. The control handling device according to claim 37, wherein at least one aspect is a first aspect being a copy of a corresponding originating first aspect in the second system and arranged to invoke a function in the first system for a client of the first system.

39. The control handling device according to claim 37, wherein at least one aspect is a second proxy aspect that is arranged to invoke a function in the second system associated with a corresponding originating aspect for a client of the first system.

40. First computerised control system providing control of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container and comprising a control handling device having:
    at least one proxy container corresponding to an originating container in the second system,
    aspects corresponding to originating aspects of the originating container, being linked to said proxy container,
    wherein the device is arranged to
    receive, in the proxy container, an access request to a function related to the proxy container,
    locate an aspect associated with the function,
    determine whether the aspect is a first aspect being a copy of an originating aspect of the second system or a second proxy aspect,
    invoke a function in the first system of said first aspect if the aspect is a first aspect being a copy of an originating aspect of the second system, and
    invoke a function in the second system associated with a corresponding originating aspect via said second proxy aspect if the aspect is a second proxy aspect;
    wherein the second system restricts for which originating containers a proxy container can be created.

41. The control system according to claim 40, further comprising an access requesting unit arranged to provide communication between aspects of the proxy container and elements in the second system providing data associated with corresponding originating aspects of the second system.

42. The control system according to claim 41, wherein the access requesting unit comprises or has access to a mapping between a proxy container identity and an originating container identity.

43. Connected systems comprising a first computerised control system and a second computerised control system, the second system comprising:
    at least one originating container for control of a real world object and being linked to at least one originating aspect representing data or operations of the originating container,
    the first control system comprising a control handling device having:
at least one container for control of the real world object in the first system and being linked to at least one aspect representing data or operations of the container,
    at least one proxy container corresponding to an originating container in the second system,
    aspects corresponding to originating aspects of the originating container, being linked to said proxy container,
    wherein the device is arranged to
    receive, in the proxy container, an access request to a function related to the proxy container,
    locate an aspect associated with the function,
    determine whether the aspect is a first aspect being a copy of an originating aspect of the second system or a second proxy aspect,
    invoke a function in the first system of said first aspect if the aspect is a first aspect being a copy of an originating aspect of the second system, and
    invoke a function in the second system associated with a corresponding originating aspect via said second proxy aspect if the aspect is a second proxy aspect;
    wherein the second system restricts for which originating containers a proxy container can be created.

44. The connected systems according to claim 43, wherein the first control system includes a mapping between a proxy container identity and a corresponding originating container identity.

45. The connected systems according to claim 44, wherein the second system comprises an access providing unit arranged to restrict the originating containers that can be mapped to proxy containers in the first system.

46. The connected systems according to claim 43, wherein there is more than one second system for which proxy containers and aspects are provided in the first system.

47. The connected systems according to claim 43, wherein there is more than one first system in which proxy containers and aspects are provided for originating containers and aspects of second systems.

48. The connected systems according to claim 43, wherein said first system comprises:
    at least one originating container for control of a real world object and being linked to at least one originating aspect representing data or operations of the originating container, and
    the second system comprises a control handling device having:
at least one proxy container corresponding to an originating container in the first system, and aspects corresponding to originating aspects of the originating container, being linked to said proxy container.

49. Computer program product comprising computer software recorded on a non-transitory computer-readable medium which when executed on a processor operates to provide control, in a first computerised control system, of a real world object provided in relation to a second computerised control system, where said first system comprises at least one container for control of the real world object in the first system and being linked to at least one aspect representing data or operations of the container and where said real world object is represented in the second system by an originating container being linked to at least one originating aspect representing data or operations of the originating container, comprising computer program code to make a control handling device, when said code is loaded into the control handling device, implement:

at least one proxy container corresponding to an originating container in the second system, and aspects corresponding to originating aspects of the originating container linked to said proxy container, wherein the device is arranged to receive, in the proxy container, an access request to a function related to the proxy container, locate an aspect associated with the function, determine whether the aspect is a first aspect being a copy of an originating aspect of the second system or a second proxy aspect, invoke a function in the first system of said first aspect if the aspect is a first aspect being a copy of an originating aspect of the second system, and invoke a function in the second system associated with a corresponding originating aspect via said second proxy aspect if the aspect is a second proxy aspect;

wherein the second system restricts for which originating containers a proxy container can be created.

\* \* \* \* \*